United States Patent [19]

Kato

[11] 4,231,850
[45] Nov. 4, 1980

[54] PROCESS FOR A CATIONIC CATHODIC ELECTROCOAT

[75] Inventor: Hironobu Kato, Yokohama, Japan

[73] Assignee: Nissan Motor Company, Limited, Yokohama, Japan

[21] Appl. No.: 28,939

[22] Filed: Apr. 11, 1979

[30] Foreign Application Priority Data

Apr. 12, 1978 [JP] Japan ............................ 53-42086

[51] Int. Cl.³ ...................... C25D 13/04; C25D 13/12
[52] U.S. Cl. ................................................. 204/181 C
[58] Field of Search ................................... 204/181 C

[56] References Cited

U.S. PATENT DOCUMENTS

| | | | |
|---|---|---|---|
| 3,663,399 | 5/1972 | Loop | 204/181 C |
| 3,663,400 | 5/1972 | Christenson et al. | 204/181 C |
| 3,663,401 | 5/1972 | Christenson et al. | 204/181 C |
| 3,663,404 | 5/1972 | Loop | 204/181 C |
| 3,663,405 | 5/1972 | Christenson et al. | 204/181 C |

*Primary Examiner*—Howard S. Williams
*Attorney, Agent, or Firm*—Schwartz, Jeffery, Schwaab, Mack, Blumenthal & Koch

[57] ABSTRACT

Cationic cathodic electrocoat is conducted by using a cationic electrodepositable paint bath having a pH value of about 6.0–8.0 and by supplementing the bath with a supplemental feed paint prepared by mixing a filtrate obtained by filtering the above described electrodepositable paint bath and a supplemental feed electrodepositable paint having a lower neutralization equivalent than the former electrodepositable paint to dissolve and disperse said paint to obtain a dispersion and then diluting homogeneously the obtained dispersion with the bath derived from the above described paint bath, whereby the property values of the electrodepositable paint bath are controlled.

9 Claims, 1 Drawing Figure

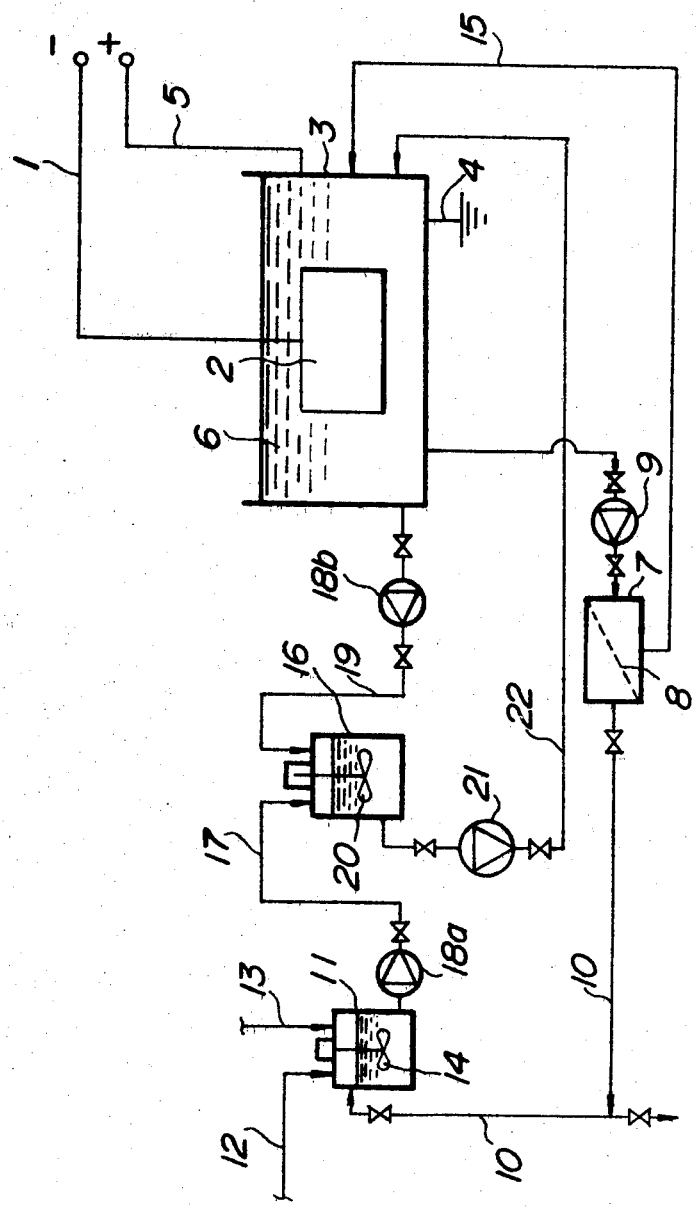

PROCESS FOR A CATIONIC CATHODIC ELECTROCOAT

BACKGROUND OF THE INVENTION

The present invention relates to a procees for a cationic cathodic electrocoat by using a cationic electrodepositable paint, and more particularly to a process for carrying out the electrodeposition by supplementing the electrodeposition bath prepared by diluting a cationic electrodepositable paint with deionized water with a supplemental feed paint having a lower neutralization equivalent than the cationic electrodepositable paint in the course of progress of the electrodeposition to control the property values of the above described electrodeposition bath.

The cationic electrodepositable paint coating has been recently practically carried out, because this process can provide a coating having a higher corrosion resistance than an anionic electrodepositable paint coating and obtain a light colored electrodeposition. The paint to be used for the cationic electrodepositable paint coating is based on a film-forming synthetic resin partially neutralized with an organic or inorganic acid, and the electrodeposition bath prepared by using such a paint has a pH value of 3-8.

However, in the bath having a pH value of 3-5, there is no problem in supplementing the paint in the course of progress of the electrodeposition coating, but an electrodeposition tank made of a metal must be insulated at the inner surface with a coating, and the inner surface of installations of pipings and the like in contact with the paint must be formed with an acid resistant material, so that the coating installation cost becomes very expensive. While, when the paint has pH value of 6-8, there has been problems in supplementing the paint to be added to the electrodeposition bath. That is, the process wherein a large amount of surfactant is compounded to a supplemental feed cationic electrodepositable paint having a high solids content to improve the solubility and dispersability of the supplemental feed paint to the electrodeposition bath upon supplementing, has been proposed, but the qualities of the coated film, such as the corrosion resistance and water resistance and the like are lower due to a large amount of the surfactant, and this process has never been practically used.

In addition, the process wherein the supplementing is effected after the neutralization equivalent of the supplemental feed paint is controlled to be substantially equal to the neutralization equivalent of a film-forming synthetic resin contained in the above described cationic electrodepositable paint bath, has been proposed, but in this case, even if the supplementing aptitude is improved, the removal of the excessive organic acid caused during progress of the electrodeposition requires the use of a diaphragm or an ultrafilter. In the former, it is necessary to effect the filtration through a diaphragm to the degree that the solids content in the electrodeposition becomes insufficient, so that the above described solids content becomes insufficient and labor is needed for maintenance of the diaphragm, and therefore this procedure represents a significant detriment to the use of this electrodeposition process in mass production. In the latter, the necessary area of the ultrafilter becomes larger than the case where the ultrafilter is used in the anionic electrodepositable paint coating process, so that the amount of waste water treated increases and the amount of solvent in the electrodeposition bath is reduced. Therefore the cost for the ultrafiltration installation excessively increases, and an improvement has been required.

SUMMARY OF THE INVENTION

The present invention aims to obviate the above described various defects and comprises a process for coating a cationic electrodepositable paint wherein an electrodeposition bath having pH value of about 6-8 prepared from a cationic electrodepositable paint containing a film-forming synthetic resin partially neutralized with an organic or inorganic acid is used. A supplemental feed paint is prepared by mixing a filtrate derived from the electrodeposition bath with the above described film-forming synthetic resin partially neutralized to a lower neutralization equivalent than the neutralization equivalent of the former partially neutralized cationic electrodepositable paint and then diluting the thus formed mixture with the electrodeposition bath taken out from the electrodeposition tank. This supplemental feed paint is added to the cationic electrodepositable paint bath to control the property values of the electrodeposition bath, and the electrodeposition is continuously carried out.

The film-forming synthetic resins to be used for the cationic electrodepositable paint according to the present invention include basic water dispersable or water soluble resins (referred to as basic water dispersable resin hereinafter), which are partially neutralized with an organic or inorganic acid, for example, epoxy, acrylic or polybutadiene series resins containing a large number of amino groups. As embodiments of such resins, mention may be made of cationic resins of the type marketed by KANSAI PAINT K.K. under the designation Electron No. 9000 base resin, which products mainly comprise reaction products of (A), (1) a reaction product of an epoxy resin with a basic amino compound or (2) a mixture or a reaction product of polyamide resins having basic amino groups, with (B) partially blocked polyisocyanate compounds. However, these resins are not limited thereto.

As neutralizing agents by which the above described basic water dispersable resins or a mixture of a basic water dispersable resin and a hydrophilic solvent described hereinafter is partially neutralized to provide a hydrophilic property and the water solubility, use may be made of organic acids, such as acetic acid, hydroxyacetic acid, propionic acid, butyric acid, lactic acid, glycine (aminoacetic acid) and the like, and inorganic acids, such as sulfuric acid, hydrochloric acid, phosphoric acid and the like and among them, acetic acid or hydroxyacetic acid is preferable.

An amount of the neutralizing agents compounded against the above described basic water dispersable synthetic resins having a basic value of about 50-200 is preferred to be within the range of 0.1-0.4 in the neutralization equivalent and the thus neutralized paint is diluted with deionized water to the desired solids content. When the neutralization equivalent is lower than about 0.1, the water solubilization of the above described resins becomes difficult, and when the neutralization equivalent is higher than about 0.4, the redissolution of the coated film is apt to be caused.

The neutralization equivalent of the supplemental feed paint is preferred to be 0.03-0.2.

As the hydrophilic solvents, use may be made of alcoholic solvents, such as ethanol, n-propanol, isopropanol, n-butanol, sec-butanol, tert-butanol, isobutanol and the like; glycol etheric solvents, such as ethylene glycol monomethyl ether, ethylene glycol monoethyl ether, ethylene glycol mono-n-propyl ether, ethylene glycol monoisopropyl ether, ethylene glycol monobutyl ether, diethylene glycol monobutyl ether and the like; esters, such as methyl acetate, ethyl acetate, isopropyl acetate, methyl acetoacetate, ethyl acetoacetate, ethylene glycol monomethyl ether acetate, ethylene glycol monoethyl ether acetate, diethylene glycol monomethyl ether acetate, diethylene glycol monoethyl ether acetate, diethylene glycol monobutyl ether acetate and the like.

As surfactants to be added upon preparing paints, nonionic and/or cationic surfactants are preferred. The nonionic surfactants include polyhydric alcohol partial ester compounds, for example, polyethylene glycolic compounds and sorbitan fatty acid esters, such as, polyethylene glycol alkyl ester, polyethylene glycol alkyl ether, polyethylene glycol alkyl phenyl ether, polyethylene glycol alkylamide, polyethylene glycol alkylamine, polyethylene glycol sorbitan fatty acid ester, Pluronic (made by Wyandotte Chemicals Corp.), Tetronic (made by Wyandotte Chemicals Corp.) and the like. The cationic surfactants include amine salts, and quaternary ammonium salts of long chain aliphatic acids and salts of high molecular weight aliphatic amines.

In varnishes consisting of the above described basic water dispersable resin, neutralizing agent, solvent and surfactant is dispersed a pigment to prepare a cationic electrodepositable paint having a high solids content and the resulting mixture is diluted with deionized water to the necessary solids content (for example about 12% by weight). The resulting dispersion is used as the electrodeposition bath.

The pH value of the electrodepositable paint bath may be adjusted to be 6.0-8.0 by selecting the basic value of the basic water dispersable resin, the compounding ratio thereof, the compounding ratio of the neutralizing agent to be used and the neutralization equivalent of the above described basic water dispersable resin and neutralizing agent.

The present invention will be explained in more detail with reference to the following non-limiting Examples.

BRIEF DESCRIPTION OF THE DRAWING

For a better understanding of the invention, reference is taken to the accompanying drawing, wherein:

The attached FIGURE is a diagrammatical schematic view of an installation for carrying out the present invention.

DETAILED DESCRIPTION OF PREFERRED EMBODIMENTS

The following examples are given for the purpose of illustration of this invention and are not intended as limitations thereof.

The attached drawing diagrammatically illustrates an installation for carrying out the process according to the present invention, wherein an article 2 to be coated forms a cathode to which negative voltage of 240 V is applied through a lead line 1 connecting the article 2 to a cathode of a direct current supply source. For the sake of a clarity, a hanger for suspending the article 2, a conveyor, insulators and the like are not shown in the drawing. An electrodeposition tank 3 is made of, for example, a steel within which a cationic electrodepositable paint bath 6 of pH 6.0-8.0 is accommodated and which serves as a bare anode and is grounded by a ground line 4 and is connected by a lead line 5 to an anode of the direct current supply source. The numeral 7 is a filtering apparatus including an ultrafilter 8 (which is equivalent to the diaphragm UFC-10000 manufactured by Abcore Co., Ltd.) and ultrafilters the above described paint bath 6 fed under pressure thereinto by a centrifugal pump 9. The ultrafiltrate is fed through a pipe 10 to a first supplemental feed tank 11 provided with a supply pipe 12 for supplemental feed depositable paint having a neutralization equivalent lower than that of the depositable paint bath 6, a pipe 13 for supplying deionized water and a stirrer 14 in the form of a propeller for mixing and dispersing (or dissolving) the supplemental feed paint and the ultrafiltrate, if necessary after adding deionized water. The concentrated bath from the above described filter 7 is returned through a pipe 15 to the electrodeposition tank 3. The supplemental feed paint in the first supplemental tank 11 is fed through a pipe 17 by a reciprocating pump 18a into a second supplemental tank 16, in which the supplemental feed paint is mixed by a stirrer 20 in the form of a propeller with the bath introduced into the tank through a pipe 19 from the paint bath 6 by a centrifugal pump 18b. The supplemental feed paint thus diluted with the paint bath 6 in the tank 3 in this manner is then supplied through a pipe 22 to the tank 3 by a centrifugal pump 21.

An explanation will be made with respect to a production method, composition embodiments and coating embodiments of the cationic electrodepositable paint to be charged in the electrodeposition tank 3 with reference to the attached drawing and Table 1.

EXAMPLE 1

100 parts by weight of epoxy series polyamide resin (made by KANSAI PAINT K.K., (Electron No. 9000 base resin) was dissolved in 40 parts by weight of a mixed solvent of ethylene glycol monoethyl ether and sec-butanol a mixture ratio of 1:1 and the resulting solution was partially neutralized with acetic acid to a neutralization value of 0.15 to obtain a varnish A. Based on 100 parts by weight of a solid content of said varnish A, 20 parts by weight of titanium white and 5 parts by weight of talc were compounded thereto, and the mixture was dispersed by means of a pebble mill for 20 hours to prepare a cationic electrodepositable paint IA. The cationic electrodepositable paint IA having the above described compounding ratio was diluted with deionized water to a solids content of 12%, and 3,000 parts by weight of the thus diluted paint was charged in the electrodeposition tank 3. The pH value of the electrodepositable paint bath was 7.4.

The same epoxy series polyamide resin as used in the cationic electrodepositable paint IA was dissolved in the above described mixed solvent (hydrophylic solvent) and then the resulting solution was partially neutralized with acetic acid to a neutralization equivalent of 0.05 to obtain a varnish B. Based on 100 parts by weight of the varnish B, 20 parts by weight of titanium white and 5 parts by weight of talc were compounded thereto, and the resulting mixture was dispersed by means of a pebble mill for 20 hours to prepare a supplemental feed paint IB (solids content: 63%) for the cationic electrodepositable paint IA.

Then, a cathode, that is an article 2 to be coated, was dipped into the cationic electrodepositable paint bath 6 charged in the tank 3 as mentioned above and the electrodeposition was carried out under the electrodeposition condition of 240 V×3 minutes. After the electrodeposition was effected continuously, the solids content of the above described paint bath was lowered from 12.0% to 11.2%, the pH value was lowered from 7.4 to 7.1 and the specific conductivity was lowered from 996 $\mu$mho/cm to 880 $\mu$mho/cm. Then, 38.1 parts of the supplemental feed paint IB prepared by the above described compounding ratio was charged into the first supplemental feed tank 11 and 38.1 parts of the ultrafiltrate of the electrodeposited paint bath 6 was charged therein through the pipe 10 while stirring the supplemental feed paint IB by means of the propeller stirrer 14, and the total amount of the resulting mixture was introduced into the second supplemental feed tank 16 through a pipe 17 and a pump 18a. In addition, 381 parts of the electrodeposited paint bath 6 was introduced into said second supplemental feed tank 16 through the pipe 19 and the pump 18b from the tank 3 while rotating the stirrer, and further the stirring was continued to obtain a uniform dispersion, after which the total amount of the dispersion was added into the tank 3 through the pipe 22.

The supplementing aptitude of the paint according to this process was good. Furthermore, therefore, the properties of the electrodepositable bath 6 were favorably controlled. Thus, the solids content of the bath was increased from 11.2% to 12%, the pH value was increased from 7.1 to 7.4 and the specific conductivity was increased from 880 $\mu$mho/cm to 1,050 $\mu$mho/cm.

Further, after the electrodeposition was carried out continuously under the same conditions as described above, when the solid content in the bath became 11.0%, the supplemental feed paint IB was added in the same manner as described above, and such a cycle was repeated several times however the supplementing aptitude of the supplemental feed paint was good, and the properties of the bath were able to be controlled as mentioned above. The result of the electrodeposition in this case was as follows under the conditions of application of 240 V×3 minutes and drying of the coating of 180° C.×30 minutes. The thickness of coating was 20–25 $\mu$, the throwing power (pipe process) was 18–20 cm and the appearance of the coated film was satisfactory.

Corrosion when a black surface steel plate (about 150 mm×30 mm×3 mm) was dipped in an electrodepositable paint bath having a pH of 7.1 for 3 months was observed, but no discoloration nor other abnormal phenomenon occurred with respect to the dipped portion, and occurrence of partial and very slight corrosion was observed with respect to the non-dipped portion.

It has been found from the above described Example 1 that when the electrodeposition tank made of steel was used as the bare anode, if the electrodepositing process according to the present invention was carried out, good control of the electrodeposition bath and good electrodeposition coating can be obtained. However, even if a diaphragm anode is used, the cationic electrodeposition coating process of the present invention can be similarly carried out.

EXAMPLE 2

The same epoxy series polyamide resin as used in Example 1 was dissolved in a mixed solvent of ethylene glycol monoethyl ether and sec-butanol and the resulting solution was partially neutralized by acetic acid to a neutralization equivalent of 0.25 to obtain a varnish C. Based on 100 parts by weight of the solid content of the varnish C, 20 parts by weight of red oxide and 5 parts by weight of talc were compounded thereto and the mixture was dispersed by means of a pebble mill for 20 hours to prepare cationic electrodepositable paint IIC. The cationic depositable paint IIC having such a compounding ratio was diluted with deionized water to a solids content of 12%, which was charged into the electrodeposition tank.

The same epoxy series polyamide resin as used in the cationic electrodepositable paint IIC was dissolved in the mixed solvent of ethylene glycol monoethyl ether and sec-butanol and the resulting solution was neutralized to a neutralization equivalent of 0.10 by acetic acid to prepare a varnish D. Based on 100 parts by weight of a solids content of the varnish D, 20 parts by weight of red oxide and 5 parts by weight of talc were compounded thereto and the resulting mixture was dispersed by means of a pebble mill for 20 hours to prepare a supplemental feed paint IID (solids content: 63%) for the cationic electrodepositable paint IIC.

Then, an article to be coated was dipped into the electrodepositable paint bath and electrodeposited under the electrodeposition condition of 240 V×3 minutes. After this electrodeposition was substantially continuously carried out, the solids content, pH value and specific conductivity of the paint bath lowered from 12.0%, 6.6 and 1,200 $\mu$mho/cm to 11.0%, 6.2 and 900 $\mu$mho/cm respectively.

Then, 20 parts by weight of the supplemental feed paint IID prepared in the above described compounding ratio was gradually added to 10 parts by weight of the ultrafiltrate derived from the electrodepositable paint IIC bath (solids content: 11–12%) and having the components as shown in Table 2, while stirring to obtain a mixed solution IID'. This mixed solution was homogeneously mixed with the electrodeposited bath (solids content: 11%) derived from the electrodeposition tank using the paint IIC by means of a pipeline homomixer (made by TOKUSHU KIKO KOGYO K.K.), and the resulting mixture was returned to the electrodeposition tank. The solubility and dispersability of the supplemental feed paint when said supplemental feed paint was supplemented to the electrodeposition tank was good, and any segregation of the solids content of the paint was not found.

After finishing this supplement, the solids content, pH and specific conductivity of the paint bath were increased from 11%, 6.2, and 900 $\mu$mho/cm to 12%, 6.6 and 1,200 $\mu$mho/cm respectively. Then, the electrodeposition was carried out under the electrodepositing condition of 240 V×3 minutes, but the coated surface was good, and the satisfactory continuous coating ability was obtained.

The corrosion when a black surface steel plate (about 150 mm×90 mm×3 mm) is dipped into an electrodepositable paint bath having a pH value of 6.2 for 3 months was observed, but corrosion was not found at the dipped portion, and the occurrence of corrosion was partially observed with respect to the non-dipped portion.

COMPARATIVE EXAMPLE 1

The same cationic electrodepositable paint IIC as used in Example 2 was diluted with deionized water to a solids content of 12% and the diluted paint was charged into the electrodeposition tank as the electrodeposition bath. An article to be coated was dipped into the thus formed bath, and the electrodeposition was continuously carried out in this bath under the electrodeposition condition of 250 V×3 minutes, and when the solid content in the bath decreased from 12.0% to 11.0%, the electrodeposition was interrupted.

Then, 38 parts by weight of the same supplemental feed paint IID (solids content: 63%) as used in Example 2 was gradually added into 100 parts by weight of the above described electrodeposition bath having the solids content of 11% and the stirring was effected for about 20 minutes, and then, another 280 parts by weight of the above described electrodeposition bath having the solids content of 11% was added thereto. The mixture was stirred for 20 minutes and then supplemented to the electrodepositable paint bath. However, in this supplementing process, the segregation of the supplemental feed paint was observed, and it has been found that the dispersability of the supplemental feed paint to the electrodepositable paint bath is poor. After this supplementing, the electrodeposition was carried out under the same electrodeposition condition as described above, but seeding was caused on the plane surface of the coated article due to the segragation of the supplemental feed paint.

The corrosion property of the black surface steel plate and the properties of the electrodepositable paint bath are shown in Table 1.

COMPARATIVE EXAMPLE 2

The epoxy series polyamide resin having the basic value of 80 described in Example 1 was dissolved in the mixed solvent of ethylene glycol monoethyl ether and sec-butanol, and the resulting solution was partially neutralized to a neutralization equivalent of 0.5 to obtain a varnish E. Based on 100 parts by weight of the varnish E, the same parts by weight of the same pigment as described in Example 1 was added thereto to prepare cationic electrodepositable paint IV. This paint was diluted with deionized water to a solids content of 12%, and the thus diluted paint was used as the electrodepositable paint bath, which has a pH of 5.3.

An article to be coated was continuously subjected to electrodeposition by using this electrodepositable paint bath under the electrodeposition condition of 240 V×3 minutes, and when the solids content of the bath became 11.2%, a supplemental feed paint IB' (solids content: 63%) which is different from the supplemental feed paint IB of Example 1 only in the point that the neutralization equivalent obtained by using acetic acid is 0.15–0.2, was supplemented to the electrodepositable paint bath in the same manner as described in Example 1. As the result, the pH value and the solids content of the bath were increased from 4.5 and 11.2% to 5.6 and 12.0%, respectively, so that the electrodeposition coating was further carried out. The coated surface was good, and the satisfactory continuous coating ability was obtained.

The corrosion when a black surface steel plate was dipped into the above described electrodepositable paint bath in the same manner as described in Example 1 was determined, and the black surface steel plate was considerably discolored at the portion dipped into the electrodepositable paint bath, and the dissolution of the metal was apparently observed.

In Comparative Example 2, the supplementing aptitude of the electrodepositable paint was good, but the corrosion of the black surface steel plate was noticeable, so that when the electrodeposition coating shown in Comparative Example 2 was carried out in a mass production scale, the electrodeposition tank must be lined, and an anode provided within a diaphragm chamber is necessary.

As mentioned above, in the cationic electrodepositable paint coating process of the present invention, a cationic electrodepositable paint containing a film-forming synthetic resin, which is partially neutralized with an inorganic acid, or organic acid is diluted with deionized water to prepare an electrodepositable paint bath having pH value of 6–8 and is supplemented with a liquid obtained by dissolving and dispersing a supplemental feed cationic electrodepositable paint partially neutralized to a lower neutralization equivalent than the neutralization equivalent of the former electrodepositable paint in a filtrate obtained by filtering the former electrodepositable paint bath, preferably the ultrafiltrate thereof, and then diluting the resulting dispersion with the electrodepositable paint bath derived from the electrodeposition tank. The electrodeposition is continuously carried out by using the thus supplemented electrodepositable paint bath, so that the diaphragm for controlling the pH, which has been heretofore needed in the electrodepositable paint coating process, is not necessary, the area of the ultrafilter used is considerably reduced, the lining for insulating the inner surface of the electrodeposition tank, which has been heretofore essential in the cationic electrodepositable paint coating, can be omitted, the materials constituting installations, such as the piping system contacting with the paint, can be changed from stainless steel to inexpensive usual steels, the drawbacks inherent in the cationic electrodepositable paint bath having a pH value of 6–8, wherein the solids content is segregated upon supplementing of the supplemental feed electrodepositable paint, can be obviated, and the properties of the bath can be controlled.

TABLE 1

|  |  | Example 1 | Example 2 | Comparative Example 1 | Comparative Example 2 |
| --- | --- | --- | --- | --- | --- |
| pH value of electrodeposition bath (when preparing said bath) | | 7.4 | 6.6 | 6.6 | 5.3 |
| Neutralization equivalent | Electrodepositable paint | 0.15 | 0.25 | 0.25 | 0.5 |
|  | Supplemental feed paint | 0.05 | 0.10 | 0.10 | 0.15–0.2 |
| Property value (electrodeposition bath) | pH value | 7.1–7.4 | 6.2–6.6 | 6.2–6.6 | 4.5–5.6 |
|  | Solid content (%) | 11.2–12.0 | 11.0–12.0 | 11.2–12.0 | 11.2–12.0 |
|  | Specific conductivity ($\mu$ mho/cm) | 880–1,050 | 900–1,200 | 900–1,200 | — |
| Supplementing aptitude | | Good | Good | Bad dispersion | Good |
| Appearance of coated film up- | | Good | Good | Seeding is formed on | Good |

TABLE 1-continued

|  |  | Example 1 | Example 2 | Comparative Example 1 | Comparative Example 2 |
|---|---|---|---|---|---|
| on continuous coating |  |  |  | plane surface |  |
| Corrosion of electrodeposition electrodeposition bath on black surface steel sheet (3 months) | Dipped portion | Not abnormal | Not abnormal | Not abnormal | Considerable discoloration, Dissolution of metal is observed |
|  | Non-dipped portion | Partially very slight corrosion | Partially corroded | Partially corroded | metal is observed Corrosion occurs on whole surface |

TABLE 2

|  | Appearence | Residue upon heating | pH | Specific conductivity | Acid value | Acid content |
|---|---|---|---|---|---|---|
| Ultrafiltrate of electrodeposition bath in Example 2 | Clear yellow | 0.714% | 6.5 | 1035 | 2.488 | 0.178% |
| Notice |  | 120 × 1 hr. | at 30° C. | at 30° C. |  |  |

What is claimed is:

1. A process for cationic cathodic electrocoating, comprising the steps of:

cathodically electrocoating a first cationic electrodepositable paint composition having a pH value between about 6.0 and 8.0 and a first neutralization equivalent;

filtering said cationic electrodepositable paint composition to produce a filtrate;

mixing said filtrate with a second electrodepositable paint composition having a second neutralization equivalent lower than said first neutralization equivalent to obtain a dispersion;

homogeneously diluting said dispersion with a portion of said first electrodepositable paint composition to obtain a supplemental feed electrodepositable paint composition; and periodically supplementing said first electrodepositable paint composition with said supplemental feed paint composition, whereby the properties of said first electrodepositable paint composition are maintained.

2. A process as claimed in claim 1, wherein said first and second electrodepositable paint composition comprise a film-forming synthetic resin partially neutralized with an organic or inorganic acid.

3. A process as claimed in claim 2, wherein said film-forming synthetic resin comprises an epoxy resin, an acrylic resin or a polybutadiene resin.

4. A process as claimed in claim 2, wherein said neutralizing acid comprises acetic acid, hydroxyacetic acid, propionic acid, butyric acid, lactic acid, aminoacetic acid, sulfuric acid, hydrochloric acid or phosphoric acid.

5. A process as claimed in claim 1, wherein said filtrate is an ultrafiltrate.

6. A process as claimed in claim 1, wherein the neutralization equivalent of said first electrodepositable paint composition is from about 0.1-0.4.

7. A process as claimed in claim 1, wherein the neutralization equivalent of said second electrodepositable paint composition is from about 0.03-0.2.

8. A process as claimed in claim 1, wherein said process is carried out continuously.

9. A process as claimed in claim 1, further comprising the step of recycling the filter residue from said filtering step back to said first electrodepositable paint composition.

* * * * *